United States Patent
Huang

(10) Patent No.: US 7,364,127 B2
(45) Date of Patent: Apr. 29, 2008

(54) SUPPORT ARM FOR A MONITOR

(76) Inventor: Ming-Hua Huang, 235 Chung-Ho Box 8-24, Taipei (TW)

(*) Notice: Subject to any disclaimer, the term of this patent is extended or adjusted under 35 U.S.C. 154(b) by 499 days.

(21) Appl. No.: 11/146,243

(22) Filed: Jun. 7, 2005

(65) Prior Publication Data

US 2006/0273231 A1    Dec. 7, 2006

(51) Int. Cl.
*A47G 29/00* (2006.01)
(52) U.S. Cl. .............. 248/276.1; 248/917; 361/680
(58) Field of Classification Search ........ 248/917–923, 248/276.1, 281.11, 282.1, 278.1, 280.11; 361/681
See application file for complete search history.

(56) References Cited

U.S. PATENT DOCUMENTS

| | | | | |
|---|---|---|---|---|
| 6,030,130 A | * | 2/2000 | Paddock et al. ............ 396/421 |
| 6,471,165 B2 | * | 10/2002 | Twisselmann ......... 248/123.11 |
| 7,207,537 B2 | * | 4/2007 | Hung ....................... 248/284.1 |
| 7,252,277 B2 | * | 8/2007 | Sweere et al. .............. 248/371 |
| 2006/0060735 A1 | * | 3/2006 | Oddsen et al. ........... 248/278.1 |

* cited by examiner

*Primary Examiner*—Korie H. Chan
*Assistant Examiner*—Steven Marsh

(57) ABSTRACT

A support arm for a monitor comprises a main support arm, an extension arm pivotally connected to the rear end of the main support arm, a monitor mount pivotally connected to the front end of the extension arm, an extension arm mount pivotally connected to the rear end of the extension arm for securing the extension arm on a wall, wherein the main support arm is provided with a spring and a link rod for adjusting the support force thereon. The main support arm further includes a wire groove for receiving a power coil and signal wires running thereon. Thereby, the support arm for a monitor is capable of using with monitors of different weights and the wire groove will protect the power coil and signal wires.

3 Claims, 7 Drawing Sheets

SUPPORT ARM FOR A MONITOR

FIELD OF THE INVENTION

The present invention relates to support arms for monitors, more particularly to a support arm for a monitor wherein the power coil and the signal wires are protected by the support arm.

BACKGROUND OF THE INVENTION

A support arm for a monitor of the prior art comprises a main support arm, an extension arm pivotally connected to the front end of main support arm, a monitor mount pivotally connected to the rear end of the main support arm and an extension arm mount connected to the rear end of the extension arm. A plurality of joints capable of moving up and down are provided between the main support arm and the monitor mount, the main support arm and the extension arm and the extension arm and the extension arm mount, whereby the view angle of the monitor will be freely adjusted.

Further, the support arm for a monitor of the prior art consists of a spring disposed within the main support arm, whereby the reaction force of the spring when stretched on the main support arm can sustain the weight of the monitor. However, the reaction force by the spring alone cannot support monitors of heavier weights, causing downward slippage of the monitors and relative troubles.

Further, the support arm for a monitor cannot adjust the spring force so that the support force of the support arm on a monitor is adjustable. Therefore, to support monitors of various weights, the manufacturer has to produce a variety of support arms, and accordingly, consumers have to buy their respective support arms, which is inconvenient.

Further, the support arm for a monitor of the prior art does not have a special wire groove for guiding the running of the power coil and signal wires along the arm, which may entangle with the spring or other parts when the support arm for a monitor is in use.

SUMMARY OF THE INVENTION

Accordingly, the primary objective of the present invention is to provide a support arm for a monitor capable of using with monitors of different weights.

The secondary objective of the present invention is to provide a support arm for a monitor having at least one wire groove for running and protecting a power coil (together with the signal wires) along the associated main support arm.

To achieve above object, the present invention provides a support arm for a monitor which comprises a main support arm, an extension arm pivotally connected to the rear end of the main support arm, a monitor mount pivotally connected to the front end of the extension arm, an extension arm mount pivotally connected to the rear end of the extension arm for securing the extension arm on a wall, wherein the main support arm is provided with a spring and a link rod for adjusting the support force thereon. The main support arm further includes a wire groove for receiving a power coil and signal wires running thereon. Thereby, the support arm for a monitor is capable of using with monitors of different weights and the wire groove will protect the power coil and signal wires.

The various objects and advantages of the present invention will be more readily understood from the following detailed description when read in conjunction with the appended drawings.

DETAILED DESCRIPTION OF THE PREFERRED EMBODIMENTS

Figure 1:
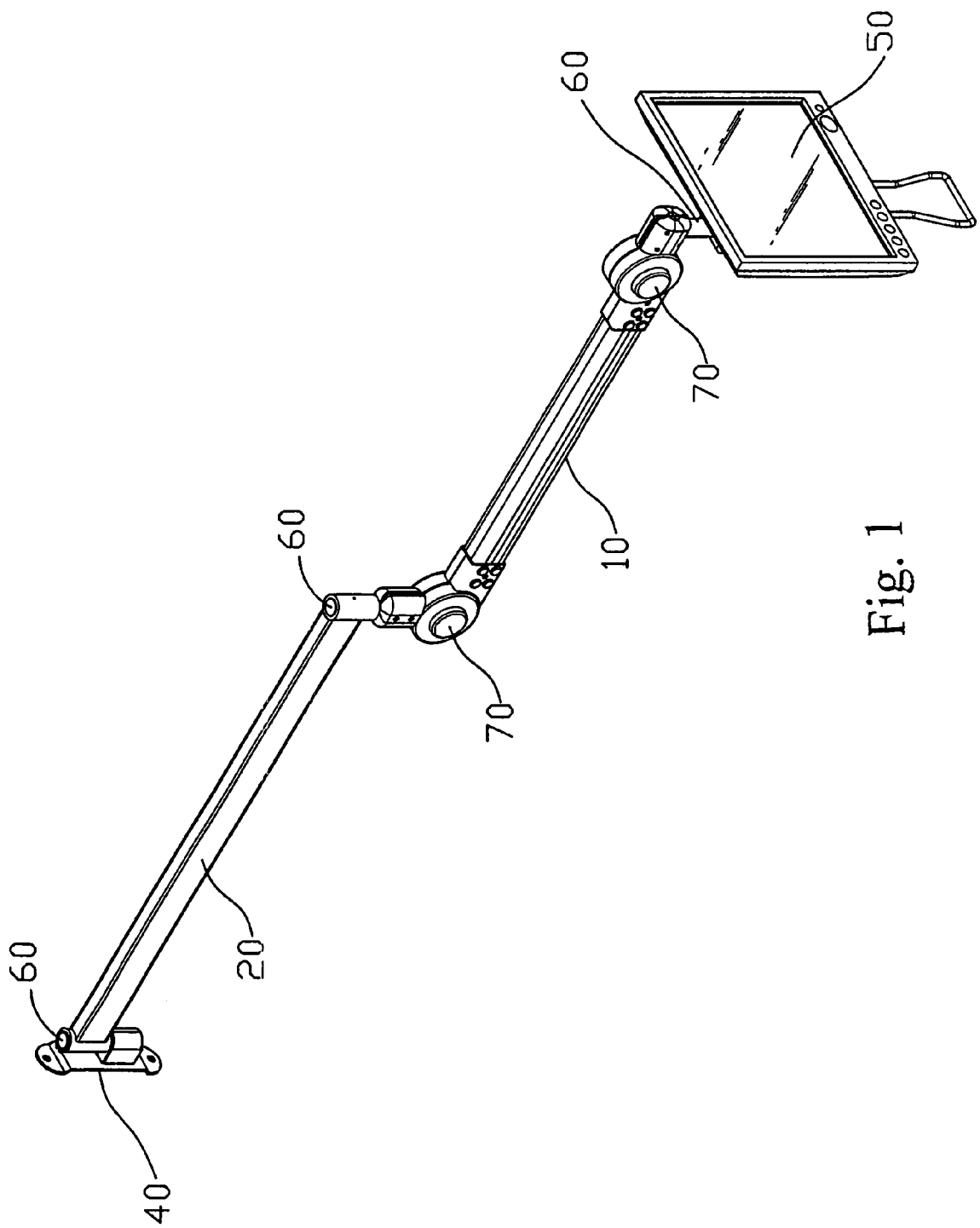
FIG. 1 is a perspective view of the present invention.

Referring to FIGS. 1 to 4, a support arm for a monitor according to the present invention comprises a main support arm 10, an extension arm 20 pivotally connected to the rear end of the main support arm 10, a monitor mount 30 pivotally connected to the front end of the extension arm 20, an extension arm mount 40 pivotally connected to the rear end of the extension arm 20 for securing the extension arm 20 on a wall 80, a monitor 50 secured on the monitor mount 30, and a plurality of vertical pivots 60 respectively disposed between the main support arm 10 and the extension arm 20, the main support arm 10 and the monitor mount 30, and the extension arm 20 and the extension arm mount 40. Thereby, the main support arm 10, the extension arm 20, the monitor mount 30 and the extension arm mount 40 can rotate about respective vertical pivots 60 clockwise and count-clockwise on a horizontal plane.

Further, the main support arm 10 includes a front connecting mount 11 and a rear connecting mount 12, which are mounted respectively at the front and rear ends of the main support arm 10. The connections of the front connecting mount 11 and the rear connecting mount 12 are respectively carried out by a first horizontal pin 71 and a second horizontal pin 72, whereby the main support arm 10 will rotate about the first horizontal pin 71 and the second horizontal pin 72 vertically.

To achieve the objective of the present invention, a preferred embodiment is characterized by a main support arm 10 which is a hollow rod whereon a link rod 13 and a spring 14 are disposed. The front and rear ends of the link rod 13 are respectively connected to the front connecting mount 11 and a rear connecting mount 12 with a third horizontal pin 73 and a fourth horizontal pin 74, whereby the link rod 13 will rotate about the third horizontal pin 73 and the fourth horizontal pin 74 vertically. Close to the front end of the link rod 13, there is an axial pin 15 for the engagement of a hook 132 at the tip of the spring 14. The rear end of the spring 14 is fixed to a nut 133, which is secured on a bolt 131 at the rear end of the main support arm 10.

Figure 2:
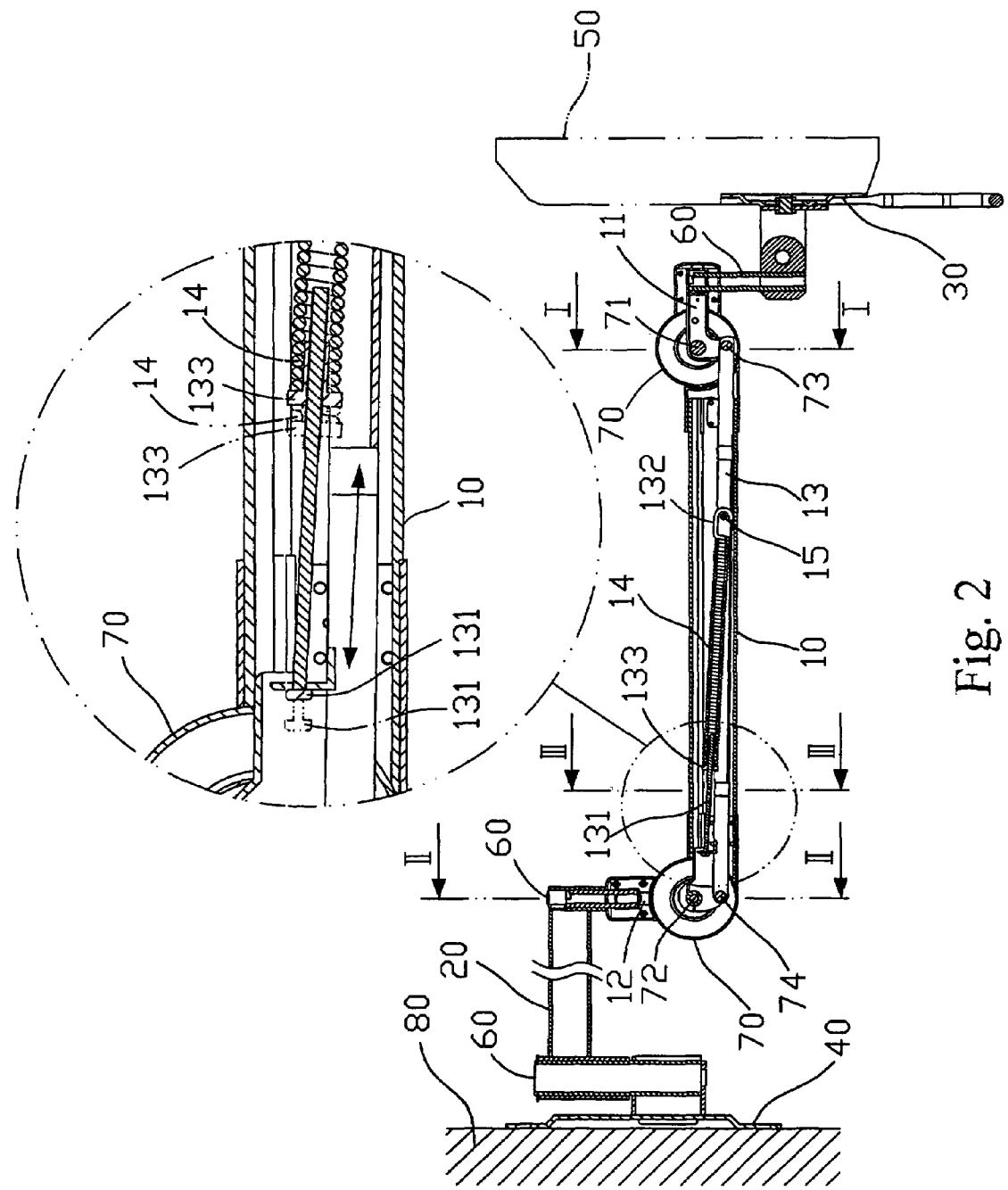
FIG. 2 is a cross-sectional view of the present invention, wherein the main support arm is extending horizontally, and wherein the bolt on the main support arm can adjust the support force thereon.
Figure 3:
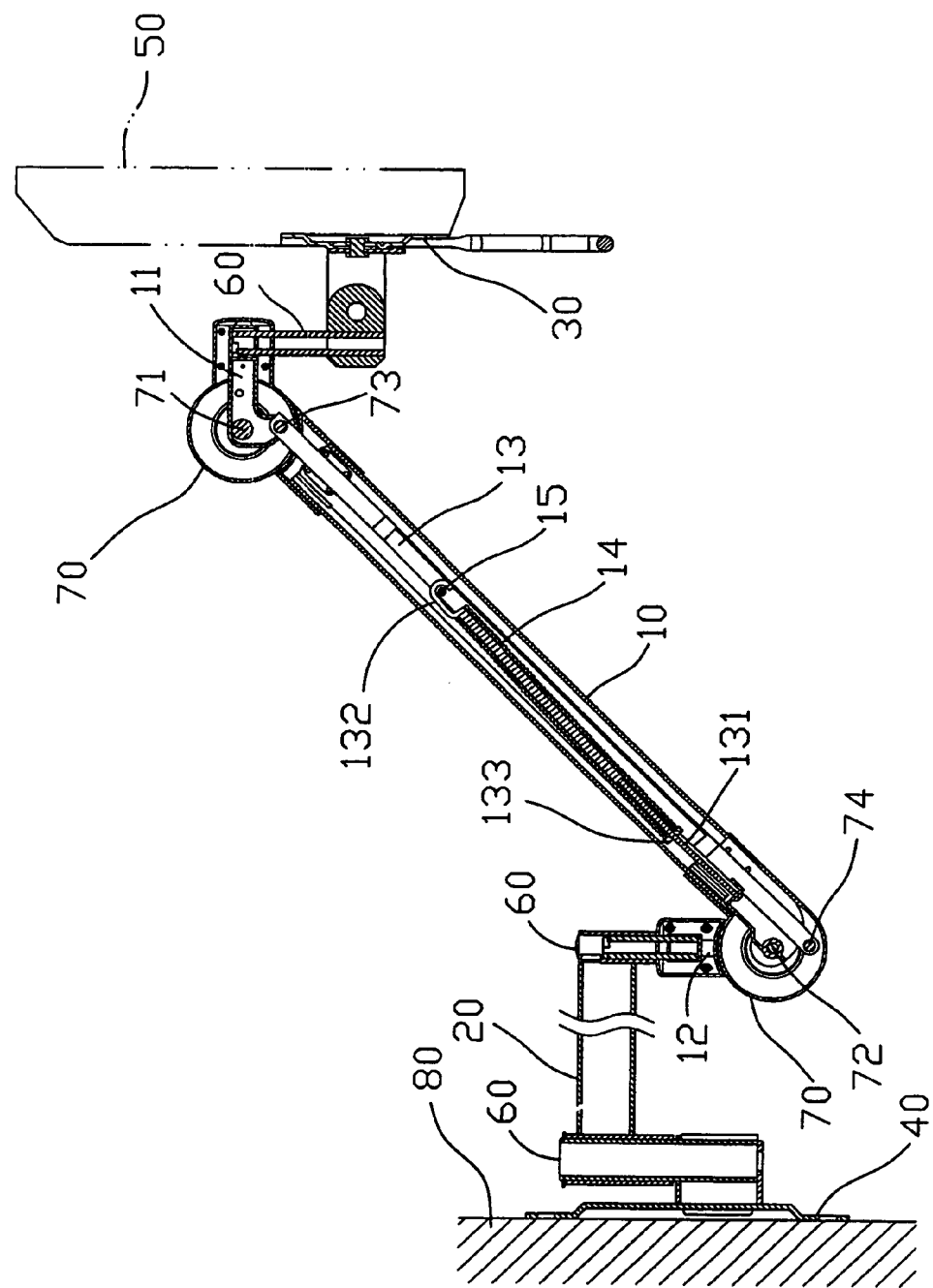
FIG. 3 is another cross-sectional view of the present invention, wherein the main support arm is tilted upward.
Figure 4:
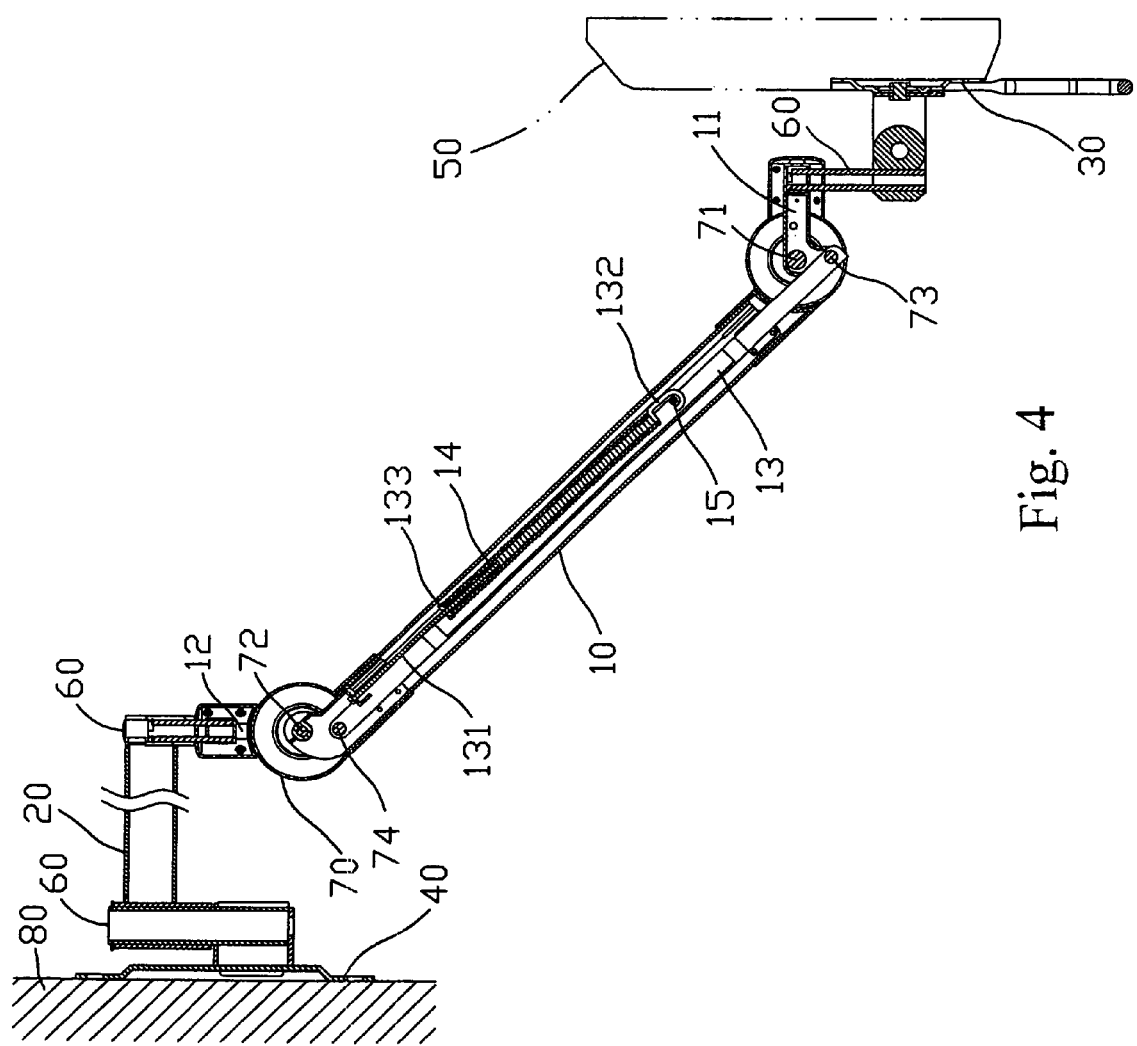
FIG. 4 is another cross-sectional view of the present invention, wherein the main support arm is tilted downward.

Referring to FIG. 2, the bolt 131 disposed at the rear end of the main support arm 10 will draw the nut 133 fixed at the rear end of the spring 14 backward, consequently the spring 14 is stretched. The reaction of the spring 14 on the main support arm 10 will therefore be sufficient for supporting it. Oppositely, the reverse rotation of the bolt 131 will draw the nut 133 at the rear end of the spring 14 forward, whereby the spring 14 will be relaxed. The reaction of the spring 14 on the main support arm 10 will therefore be lessened. Thereby, the support force exerted on the main support arm 10 can be adjusted, suitable for monitors 50 of different weights.

Figure 5:
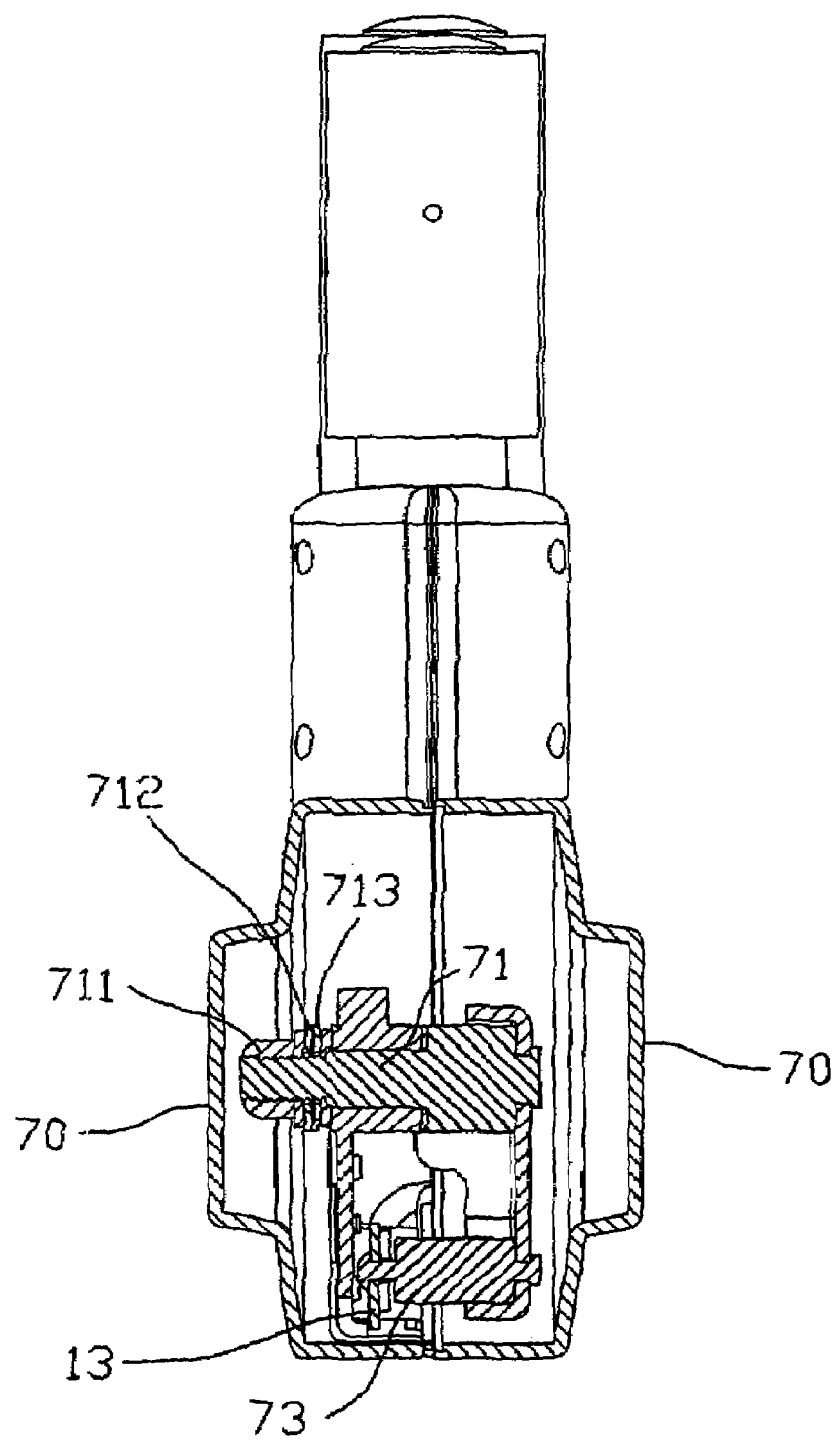
FIG. 5 is the I-I cross-sectional view of FIG. 2.
Figure 6:
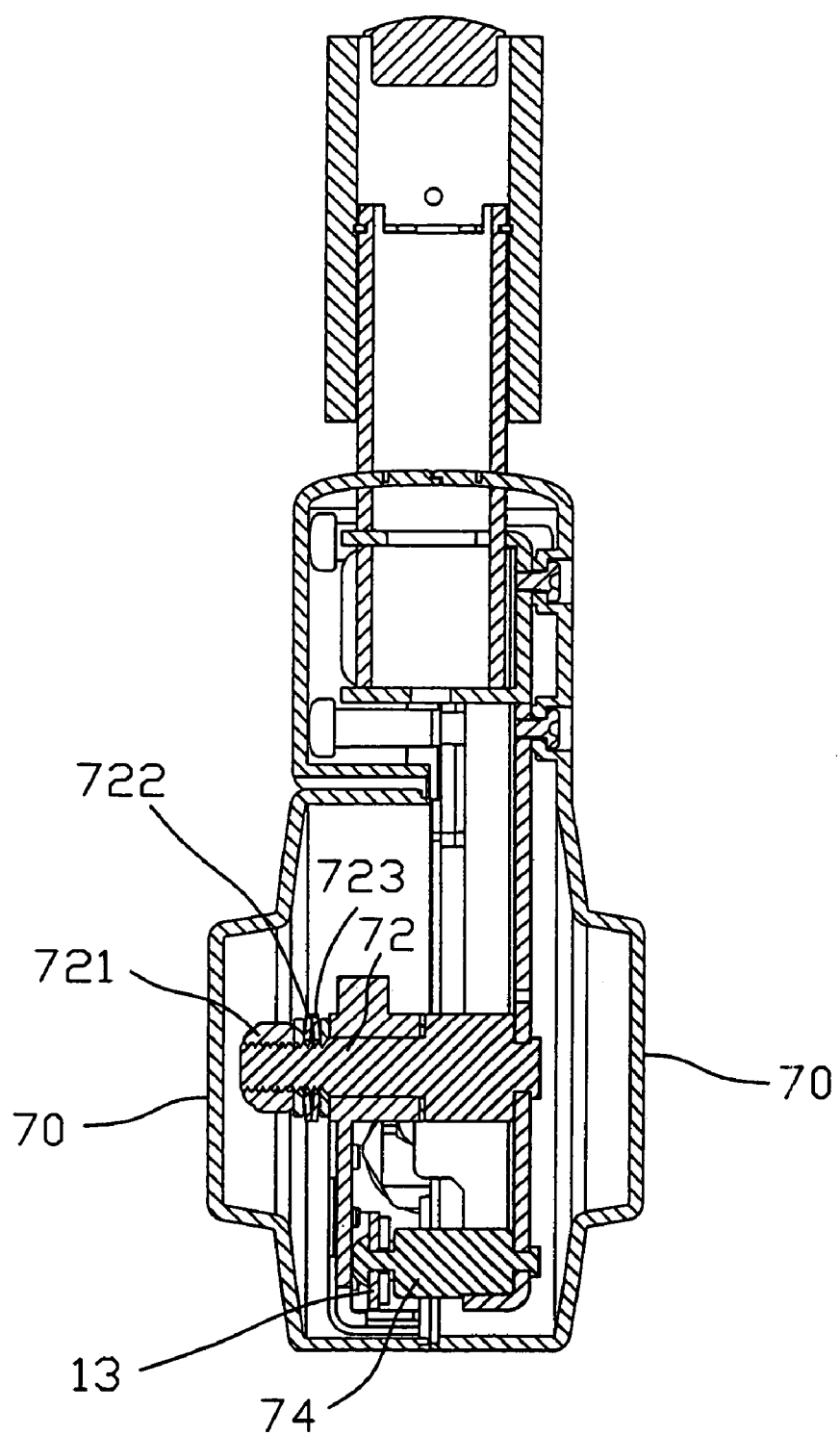
FIG. 6 is the II-II cross-sectional view of FIG. 2

Referring to FIGS. 5, 6, one end of the first horizontal pin 71 is fixed to the front connecting mount 11, and the other is secured to the main support arm 10 with a first locking nut 711. A first left circularly-arced spring plate 712 and a first right circularly-arced spring plate 713 are sandwiched between the first locking nut 711 and the main support arm 10. One end of the second horizontal pin 72 is fixed to the rear connecting mount 12, and the other is secured to the main support arm 10 with a second locking nut 721. A second left circularly-arced spring plate 722 and a second right circularly-arced spring plate 723 are sandwiched between the second locking nut 721 and the main support arm 10.

Thereby, the reaction force produced after the locking of the first left circularly-arced spring plate 712 and the first right circularly-arced spring plate 713 and the reaction force produced after the locking of the second left circularly-arced spring plate 722 and the second right circularly-arced spring plate 723 will achieve a pinching effect that prevents the main support arm 10 from falling down.

Figure 7:
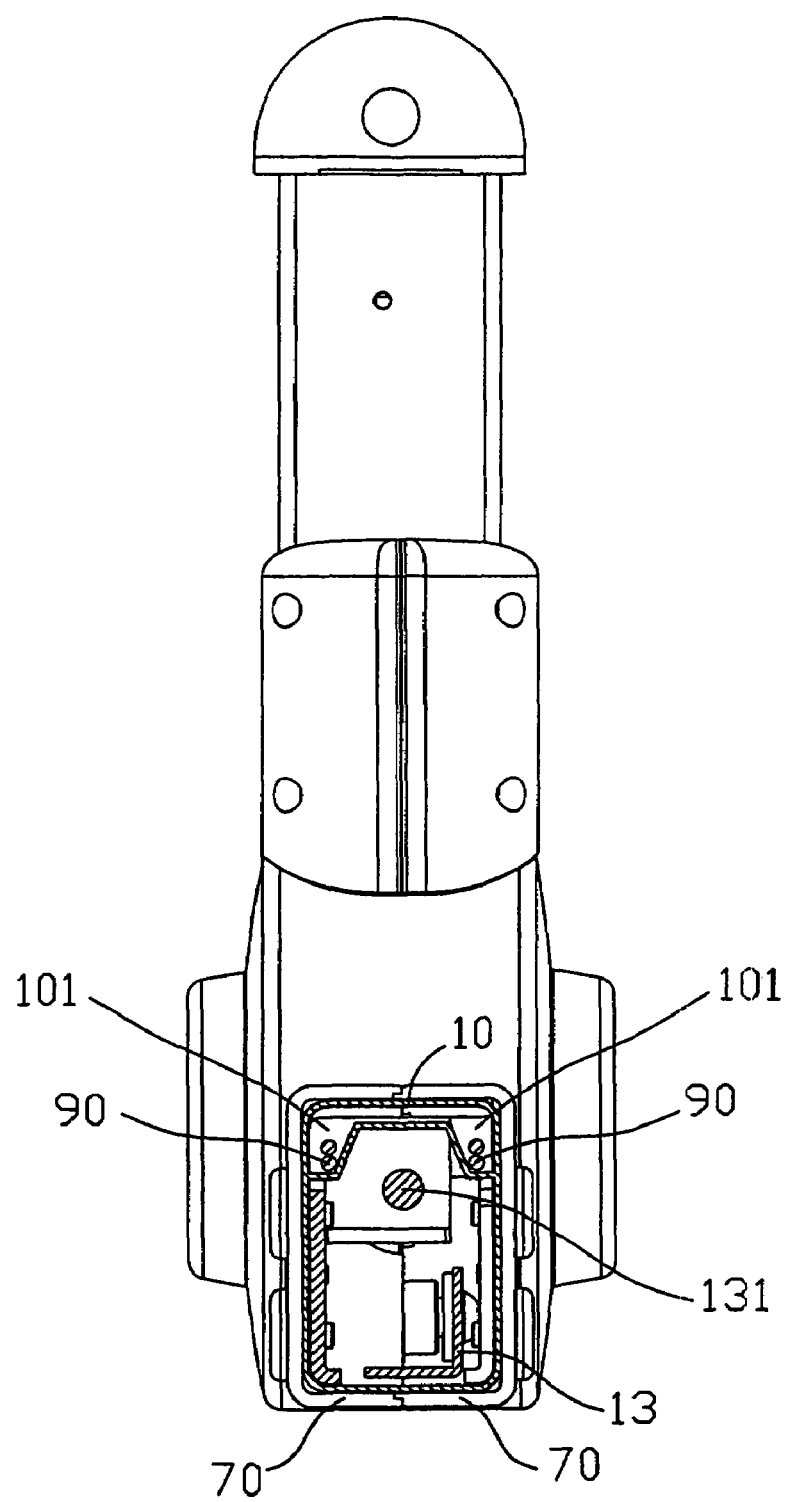
FIG. 7 is the III-III cross-sectional view of FIG. 2

Further, referring to FIG. 7, the main support arm 10 is provided with at least a wire groove 101 for housing the power coil 90 (as well as signal wires) running thereon. The wire groove 101 can also protect the wires.

Further, referring to FIGS. 5 and 6, the joint of the main support arm 10 and the extension arm 20 and the joint of the main support arm 10 and monitor mount 30 are each provided with a dust cover 70 for preventing dust accumulation.

The present invention is thus described, and it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A support arm for a monitor, comprising:
   a main support arm being a hollow rod, said main support arm having a front connecting mount and a rear connecting mount;
   an extension arm pivotally connected to a rear end of said main support arm;
   a monitor mount pivotally connected to a front end of said extension arm for securing a monitor;
   an extension arm mount pivotally connected to a rear end of said extension arm for securing said extension arm on a wall;
   a plurality of vertical pivot respectively disposed between said main support arm and said extension arm, said main support arm and said monitor mount, and said extension arm and said extension arm mount, whereby said main support arm, said extension arm, said monitor mount and said extension arm mount will rotate about respective vertical pivots clockwise and countclockwise;
   a first horizontal pin providing pivotal connection between said main support arm and said front connecting mount, serving as a vertical joint;
   a second horizontal pin providing pivotal connection between said main support arm and said rear connecting mount, serving as a vertical joint;
   a spring disposed on said main support arm;
   a link rod disposed on said main support arm, a front end and a rear end of said link rod are respectively connected to said front connecting mount and said rear connecting mount with a third horizontal pin and a fourth horizontal pin, whereby said link rod will rotate about said third horizontal pin and said fourth horizontal pin vertically, said front end of said link rod having an axial pin for the engagement of a hook atop said spring, said rear end of said spring being fixed to a nut that is secured on a bolt at said rear end of said main support arm;
   a first locking nut being fixed to one end of said first horizontal pin;
   a first left circularly-arced spring plate;
   a first right circularly-arced spring plate; said first left circularly-arced spring plate and said first right circularly-arced spring plate being sandwiched between said first locking nut and said main support arm;
   a second locking nut being fixed to one end of said second horizontal pin;
   a second left circularly-arced spring plate; and
   a second right circularly-arced spring plate, said second left circularly-arced spring plate and said second right circularly-arced spring plate being sandwiched between said second locking nut and said main support arm, whereby a reaction force produced after the locking of said first left circularly-arced spring plate and said first right circularly-arced spring plate and another reaction force produced after the locking of said second left circularly-arced spring plate and said second right circularly-arced spring plate will achieve a pinching effect that prevents said main support arm from falling down;
   whereby said bolt of said main support arm will draw said nut of said spring backward, consequently said spring will be stretched and urges a reaction force on said main support arm for supporting a monitor, and whereby an opposite rotation of said bolt will draw said nut forward and relaxes said spring, lessening said reaction of said spring on said main support arm, and whereby a support force exerted on said main support arm will be adjustable, suitable for monitors of different weights.

2. The support arm for a monitor of claim 1 wherein said main support arm is provided with at least a wire groove for housing and protecting a power coil (as well as signal wires) running thereon.

3. The support arm for a monitor of claim 1 wherein said joints of said main support arm, said extension arm, said main support arm and said monitor mount are each provided with a dust cover for preventing dust accumulation.

* * * * *